United States Patent
Kalman (10) Patent No.: US 9,882,330 B2
(45) Date of Patent: Jan. 30, 2018

(54) SOLAR PANEL ARRAY

(76) Inventor: Andrew E. Kalman, San Francisco, CA (US)

(*) Notice: Subject to any disclaimer, the term of this patent is extended or adjusted under 35 U.S.C. 154(b) by 532 days.

(21) Appl. No.: 13/186,863

(22) Filed: Jul. 20, 2011

(65) Prior Publication Data

US 2012/0024342 A1 Feb. 2, 2012

Related U.S. Application Data (60) Provisional application No. 61/368,901, filed on Jul. 29, 2010.

(51) Int. Cl.
| | | |
|---|---|---|
| *H01R 43/00* | (2006.01) | |
| *H01L 31/045* | (2006.01) | |
| *H01R 35/04* | (2006.01) | |
| *H02S 40/34* | (2014.01) | |
| *H02S 40/36* | (2014.01) | |
| *H02S 30/20* | (2014.01) | |

(52) U.S. Cl.
CPC .............. *H01R 35/04* (2013.01); *H02S 30/20* (2014.12); *H02S 40/34* (2014.12); *H02S 40/36* (2014.12); *H01R 2201/26* (2013.01); *Y10T 29/49117* (2015.01)

(58) Field of Classification Search
CPC ... H01L 23/525; H01L 23/528; H01L 23/533; H01L 27/1426; H01L 31/05; H01L 31/0504; H01L 31/0508; H01L 31/0516
See application file for complete search history.

(56) References Cited

U.S. PATENT DOCUMENTS

| | | | | |
|---|---|---|---|---|
| 3,756,858 | A * | 9/1973 | Dillard .................... | 136/245 |
| 3,795,884 | A * | 3/1974 | Kotaka .................... | 439/591 |
| 4,155,524 | A * | 5/1979 | Marello et al. ......... | 244/172.6 |
| 5,337,451 | A * | 8/1994 | Goossens ................ | 16/354 |
| 5,590,495 | A * | 1/1997 | Bressler et al. ........ | 52/173.3 |
| 6,159,056 | A * | 12/2000 | Boyle .................... | 439/700 |
| 6,320,114 | B1 * | 11/2001 | Kuechler ................ | 136/245 |
| 6,918,160 | B1 * | 7/2005 | Clark ..................... | 16/370 |
| 2006/0048340 | A1 * | 3/2006 | Zaderej ................. | 16/385 |
| 2008/0023065 | A1 * | 1/2008 | Borden et al. ......... | 136/256 |
| 2008/0156365 | A1 * | 7/2008 | Scholz et al. .......... | 136/251 |
| 2008/0185034 | A1 * | 8/2008 | Corio ..................... | 136/246 |
| 2008/0210294 | A1 * | 9/2008 | Moslehi ................. | 136/251 |
| 2009/0017870 | A1 | 1/2009 | An | |

FOREIGN PATENT DOCUMENTS

| | | |
|---|---|---|
| JP | 07-014659 U | 3/1995 |
| JP | 2001-039400 A | 2/2001 |

* cited by examiner

*Primary Examiner* — Jeffrey T Barton
*Assistant Examiner* — Edward Schmiedel
(74) *Attorney, Agent, or Firm* — Donald R. Boys; Central Coast Patent Agency, Inc.

(57) ABSTRACT

A solar panel array includes a number of elongate printed circuit boards (PCBs), each PCB supporting a number of individual solar cells linearly mounted thereon and electrically connected in series to form a solar panel, and a number of hinge assemblies, each hinge assembly including two or more hinge bodies, two backing plates, one spring, and one hinge pin, the hinge assemblies mounted between adjacent solar panels using conventional hardware in a manner connecting them together such that they may be folded over one another in a fanfold arrangement or deployed out to one hundred and eighty degrees.

6 Claims, 6 Drawing Sheets

Underside

*Fig. 7*

SOLAR PANEL ARRAY

CROSS-REFERENCE TO RELATED DOCUMENTS

The present invention claims priority to a U.S. provisional patent application Ser. No. 61/368,901, filed Jul. 29, 2010, disclosure of which is incorporated herein in their entirety herein by reference.

BACKGROUND OF THE INVENTION

1. Field of the Invention

The present invention is in the field of solar energy collection and pertains particularly to methods and apparatus for electrically interconnecting solar cells and panels deployed in a solar panel array.

2. Discussion of the State of the Art

In the art of solar power generation, multiple solar cells are often mounted on a substrate to form a solar panel capable of high efficiency generation of solar energy (electricity). Nearly all spacecraft including solar-powered vehicles have solar cells to gather energy from the Sun. Typically speaking, solar cells used in such implementations have an efficiency rating of greater than twenty-eight percent. In most implementations, epoxies, silicone, acrylic, and or RTV-class adhesives are used to mechanically attach multiple solar cells to a substrate. Substrates are typically aluminum honeycomb-type sandwiches with electrically conductive or non-conductive pads to connect solar cells to.

Soldering and spot/laser-welding are methods, which are commonly employed to forge electrical connections to and between the solar cells. It is known to the inventor that printed circuit boards (PCBs) have been used as substrates for solar panels and are provided at a standardized thickness of approximately sixty-two thousandths of an inch. Besides the ability to forge conductive traces, PCB substrates have a multitude of vias placed vertically there through to conduct heat from one side of the solar panel to the other. The supported solar cells may be interconnected in series or in parallel topologies depending on a variety of factors, including available real estate, power system capabilities, and mission requirements. Among many challenges with efficient spacing of solar cells on a solar panel substrate is electrically interconnecting the solar cells and panels without depending on added real estate. Solar panels are typically interconnected using wiring and or cabling that can contend with real estate reserved for solar cells.

Therefore, what is clearly needed is a solar panel array and method of manufacture and assembly that enables electrical interconnection in a manner that preserves real estate on the panel for more solar cell coverage.

SUMMARY OF THE INVENTION

The problem stated above is that optimum use of real estate is desirable for a solar panel array such as might be connected to a spacecraft such as a satellite or a space vehicle such as a rover for example. However, many of the conventional means for mounting and interconnecting solar cells and individual solar panels such as with cables and wires also creates a demand on the available real estate reserved for mounting solar cells. The inventors therefore considered functional elements of a solar panel array, looking for elements that exhibit interoperability that could potentially be harnessed to provide reliable and efficient interconnections between solar cells and host panels in a solar panel array without demanding additional real estate.

Every solar vehicle is propelled by the efficiency of the arrangement of solar cells on or about the vehicle, one by-product of which is an abundance of energy collected for use in powering the vehicle and operating many auxiliary functions. Most such vehicles employ solar panels arranged in array to conduct the energy collected from the individual solar cells to one or more terminals adapted to receive power generated by the array, and solar panels supporting multiple solar cells are typically a part of such apparatus.

The present inventor realized in an inventive moment that if, at the point of deployment, multiple solar panels hosting multiple solar cells could be caused to be electrically interconnected in a parallel manner through mechanical connectors, significant real estate might be preserved. The inventor therefore constructed a unique solar panel array for solar vehicles or other solar apparatus that supported more use of real estate for solar cell coverage by eliminating or sharply reducing the requirement of physical interconnection through the use of wiring or cabling between solar cells and between individual solar panels in an array. A significant optimization of available real estate for solar cell coverage results, with no impediment to efficiency of power delivery created.

Accordingly, in one embodiment of the present invention, a solar panel array is provided and includes a number of elongate printed circuit boards (PCBs), each PCB supporting a number of individual solar cells linearly mounted thereon and electrically connected in series to form a solar panel, and a number of hinge assemblies, each hinge assembly including two or more hinge bodies, two backing plates, one spring, and one hinge pin, the hinge assemblies mounted between adjacent solar panels using conventional hardware in a manner connecting them together such that they may be folded over one another in a fanfold arrangement or deployed out to one hundred and eighty degrees.

In one embodiment, electric current is passed between the solar panels via PCB traces and hinge assembly springs. In one embodiment, the hinge bodies include left-hand hinge bodies and right-hand hinge bodies. In one embodiment, the spring is a left-handed spring or a right-handed spring. In a preferred embodiment, the spring is gold plated to improve conductivity. In all embodiments the hinge bodies interface with conductive pads electrically connected within the PCBs. In one embodiment, the hinge bodies are hard-anodized aluminum having one or more surfaces coated or masked to create conductivity.

In one embodiment, the solar panel array further includes two or more offset hinge assemblies, each offset hinge assembly including two or more hinge bodies, two backing plates, one spring, and one hinge pin. In this embodiment, the offset hinge assemblies connect a fanfold style solar panel array of two or more panels to an additional panel that offloads collected power to a receiving terminal. In this embodiment, the offset hinge assembly spring is soldered at its end points within respective furrows machined into each of the hinge bodies in the offset hinge assembly. In one embodiment, the current from a fanfold panel travels from a PCB pad on the panel through the offset hinge assembly via the spring onto the opposing PCB pad and onto the offset panel.

According to one aspect of the present invention, a method is provided for enabling the passing of electric current from one solar panel to another solar panel comprising the steps (a) providing at least one hinge assembly comprising two or more hinge bodies, a hinge pin, and a spring, (b) if the hinge bodies are non-conductive, masking or plating specific surfaces of the hinge bodies that interface with conducting components of the PCBs such as electrically conductive pads on the PCBs and the electrically conductive spring interfacing the hinge bodies, and (c) mounting the hinge assemblies over conductive pads on each adjacent PCB with the spring ends in electrical communication with the conductive pads on both panels.

In this aspect, in step (a), the hinge pin and spring are co-aligned, substantially sharing the hinge axis of rotation. In one aspect, in step (a), the hinge bodies include left-hand hinge bodies or right-hand hinge bodies for a fanfold in one direction or in the other direction. In one aspect, in step (b), the hinge bodies are aluminum having a hard anodized surface. In one aspect, in step (c), the spring ends are compressed between the opposing hinge bodies and corresponding conductive pads.

According to one aspect of the method, in step (c), the spring ends are silver soldiered into furrows provided in the upward facing surfaces of opposing hinge bodies. In one aspect, in step (c), screws are inserted through openings in the back plates and PCBs to mount the hinge bodies to the PCBs, the hinge bodies having threaded openings to accept the screws. In another aspect, in step (c), screws are inserted through openings in the back plates and PCBs to mount the hinge bodies to the PCBs, the hinge bodies having threaded openings to accept the screws. In all aspects, in step (c), the conductive pads on the PCBs are connected to the negative terminal or to the positive terminal of the series-connected solar cells mounted on the PCBs to form the hinged solar panel array.

DETAILED DESCRIPTION

The inventors provide a unique solar panel array that can be furled and unfurled in a fanfold fashion using unique hinge assemblies and which communication of power from the array to a connected host panel can be accomplished through printed circuit board traces and special accommodations made possible through the hinge assemblies. The present invention will be described in enabling detail using the following examples, which may describe more than one relevant embodiment falling within the scope of the present invention.

Figure 1:
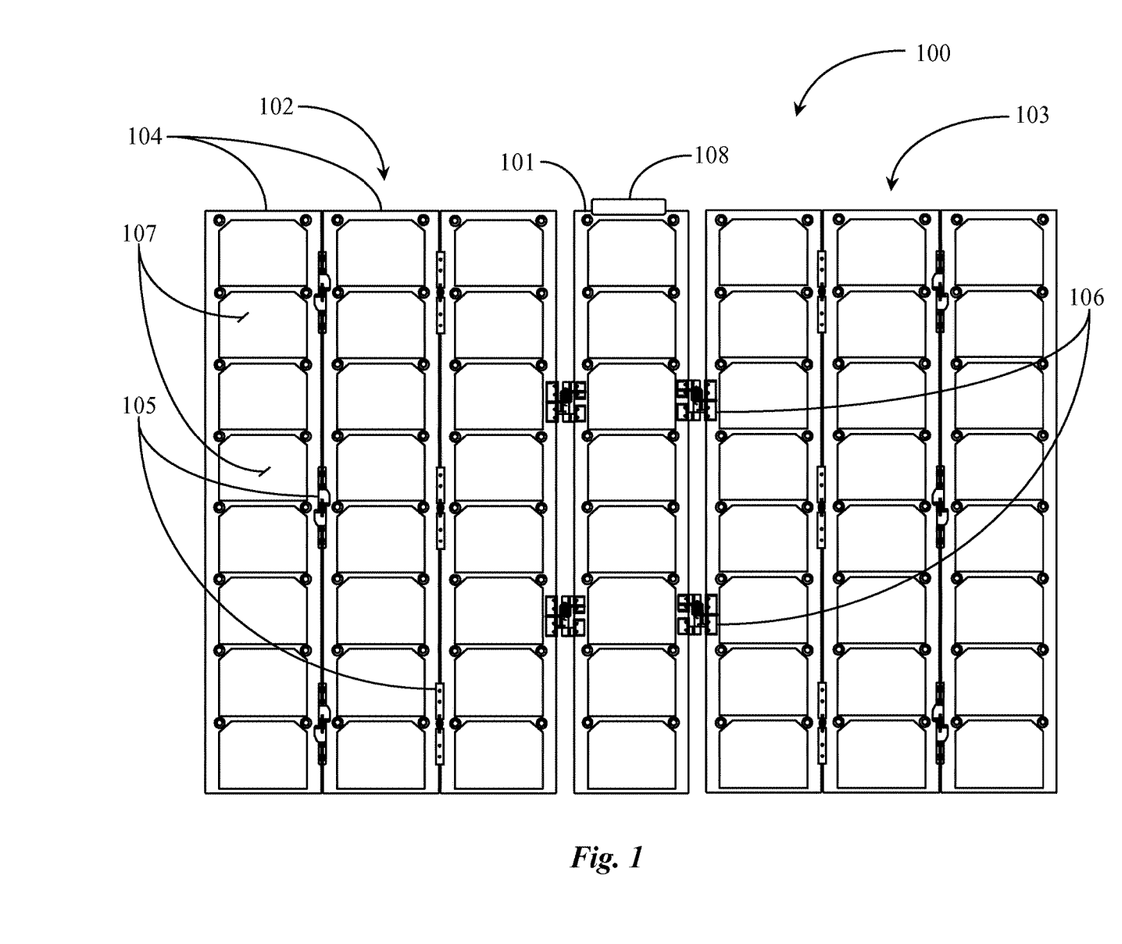
FIG. 1 is an elevation view of a solar panel array folded out to 180 degrees.

FIG. 1 is an elevation view of a solar panel array 100 folded out to 180 degrees. Solar panel array 100 includes a host solar panel 101 comprising an elongate printed circuit board (PCB) with a number of individual solar cells 107 mounted thereon and electrically connected in series for power transfer purposes. Host panel 101 has two fanfold style solar panel winglets or wings 102 and 103 connected thereto 5 using offset hinge assemblies 106. Each fanfold style winglet such as winglet 102, for example, has two or more solar panels 104 connected to one another using fanfold hinge assemblies 105.

Each winglet panel 104 has a PCB substrate with individual solar cells 107 mounted thereon and electrically connected in series as was described with reference to host panel 101. Array 100 is adapted to be installed onto a solar vehicle or satellite. In one embodiment, the array is mounted to a space satellite frame termed a "Cube Sat" by the inventors. Panel 101 serves as a host panel for transmitting the power from winglet arrays 102 and 103 to a terminal on the carrier vehicle. Host panel 101 has a power offload terminal 108 provided and attached to the top of the panel which may be used to offload the solar power collected by the individual series-connected solar cells 107.

In a preferred embodiment of the present invention, each panel whether a host panel or a winglet panel uses traditional PCB traces (electrically conductive paths) and contact pads (electrically conductive surfaces) to connect the individual solar cells together both on (in this case in series), and between panels, and to enable transfer of power from one panel to another through the solar panel array to the offload terminal of the host panel. Solar panels 104 and host panels such as panel 101 are manufactured from G10/FR4 material, also known in the art as Garolite. FR4 is the fire retardant version of G10. FR4 is common in the art of printed circuit board fabrication, and available to the inventor.

It is noted in this specification that individual solar cells 107 may be connected in parallel instead of in series without departing from the spirit and scope of the present invention. In this example connecting each solar cell in series provides a convenient and efficient manner for transferring collected energy to a collecting electrical terminal. In series connection each solar cell 107 has a positive and negative terminal. In a preferred embodiment of the present invention, winglet panels such as panels 104 and host panels such as panel 101 are manufactured to be much thinner that traditional PCBs, which are held to a standard thickness of about 62 thousandths of an inch or 62 mils.

Panels 104 and 101 in this example are about 0.030 thousandths of an inch or 0.030 mils thick. This reduction in thickness is for the purpose of enabling better heat transfer from the hot side of the panel (cell side) to the cool side of the panel (radiator side). FR4 is not very thermally conductive, necessitating the reduction in thickness of the solar panel substrate or PCB. Copper surface regions (not illustrated) are provided on both sides of the PCB substrate, the regions are stitched together by a sea of vias (vertical micro perforations) helping to transfer heat from one side of the solar panel to the backside through the vias. In this example, there are 8 individual solar cells 107 per panel. In one embodiment there may be less than eight cells per panel and in another embodiment there may be more than eight cells per panel. In a preferred embodiment, the solar cells are strategically mounted to each PCB substrate using a location jig to secure correct placement and epoxy is used to adhere the cells to the PCB material.

Fanfold hinge assembly 105 is manufactured from a lightweight but durable material such as aluminum, which has been anodized for surface hardness. In one embodiment, hinge assembly 105 includes opposing hinge bodies, backing plates for attaching the hinge bodies to the PCB substrates, a hinge pin providing the axis of rotation and a spring for enabling transfer of current between panels through hinge assemblies 105. The term fanfold refers to the arrangement of folding for each solar wing or winglet 102 or 103. The hinged panels may be folded in the style of a Japanese fan. The technique is provided to enable the panels to be folded over one another in opposite directions to form a "stack" of panels that are deployable back to a one-hundred and eighty degree display. In this example, each winglet contains three panels that are hinged to the host panel 101 on either side. These panels fold fanfold style to form an un-deployed or "stowed" stack of panels that present on each side of the host panel at approximately 90 degrees to the planer orientation of the panel.

Offset hinge assemblies 106 are provided to connect winglet panels 104 to a host panel such as host panel 101. Offset hinge assemblies 106, like fanfold hinge assemblies 105 include hinge bodies, backing plates, a spring, and a hinge pin. The materials used to manufacture the offset hinge parts may be hard-anodized aluminum as described with respect to the fanfold style hinges. Other conductive or non-conductive materials may also be used in place of aluminum without departing from the spirit and scope of the present invention. The spring in the offset hinge assembly is used to transfer current between panels as was described with respect to hinge assemblies 105. Transferring current directly between the solar panels through the hinges connecting them together enables elimination of cables and other wiring harnesses or tethers that cannot be used because they interfere with the dimensional integrity of the host framework on the space vehicle (Cubs Sat). Moreover, the use of bulky wiring and cabling can interfere with the efficiency of solar power collection and real estate requirements of the vehicle.

Each hinge assembly includes right hand and left hand hinge bodies used in pairs. The hinge bodies may be exact mirror images of one another. Each hinge body may be from the topside or from the bottom side of a PCB. The side that the assembly is mounted from determines the direction of rotation of the panel. In this example, there are three fanfold style hinges connecting the solar panels together in each fan foldable wing or winglet. There may be as few as two hinge assemblies or more than three hinge assemblies holding solar panels together in array without departing from the spirit and scope of the present invention. Likewise, there may be more than two offset hinge assemblies such as hinge assembly 106 provided in this example without departing from the spirit and scope of the present invention. Each fanfold style hinge assembly is held to a specified thickness to enable minimum spacing to be maintained between the folded panels ensuring they do not touch or rub together when in stack formation. Offset hinge assemblies 106 allow both 90 degree and one hundred and eighty-degree positions.

In this example, the left most panel 104 may fold upward and over the adjacent solar panel. The adjacent panel connected to the host panel may then fold upward to ninety degrees from the planer orientation of the host panel 101. The adjacent panel may then fold downward to finish the "stack" of panels that would be held in non-deployed ninety-degree position with respect to the host panel. The same fanfold orientation may be true for the other winglet (103) connected to the right side of host panel 101. In a preferred embodiment, current collected from the solar panels comprising the winglets 102 or 103 is carried through the fanfold hinges 105 via conductive springs to the offset hinge assemblies 105. One offset hinge assembly 105 carries the positive current of the series string while the other hinge assembly carries the negative current onto the host panel. Offload terminal (positive and negative) 108 is provided at the top of the host panel for carrying the current onto the support vehicle.

Figure 2:
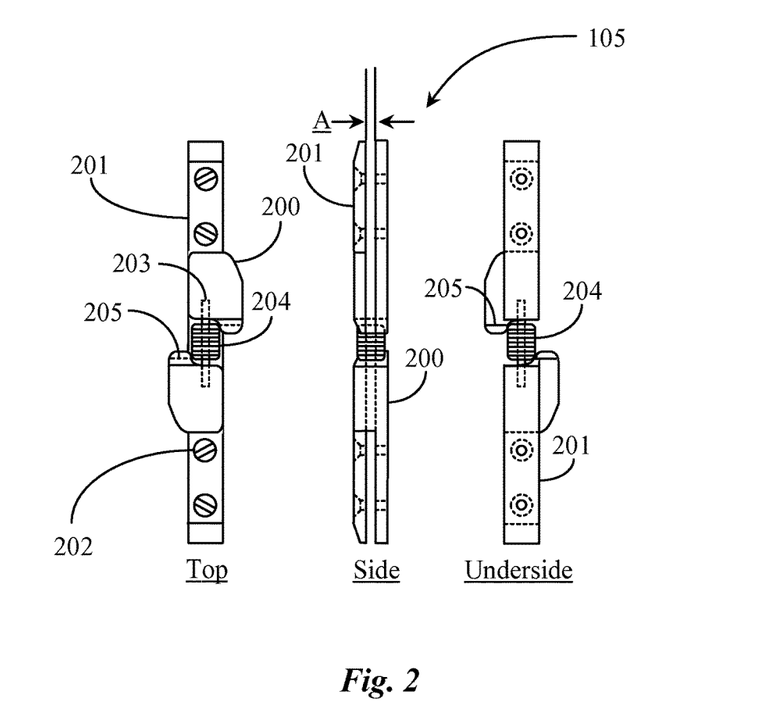
FIG. 2 is a positional view of a fanfold hinge assembly according to an embodiment of the present invention.

FIG. 2 is a positional view of fanfold hinge assembly 105 of FIG. 1 according to an embodiment of the present invention. Hinge assembly 105 is depicted in three separate views in this example so one may visualize the hinge architecture and specific features of the assembly. These views are, from left to right, the top view, a side view, and an underside view. Referring now to the top view, hinge assembly 105 includes hinge bodies 200. Hinge bodies 200 are mounted to the edges of the PCBs using backing plates 201 using screws 202. The backside of a hinge body has threaded openings visible in the side view. The edges of the PCB material are machined or otherwise modified to provide alternate mounting areas for the hinge bodies by cutouts leaving specific land areas for the hinge bodies to mount over. The screws 202 are inserted through the backing plates 201, through openings provided in respective PCB substrates (not illustrated) into threaded openings provided on the hinge bodies.

A hinge pin 203 is visible in this example in both the top and underside views. The hinge bodies are adapted to retain the hinge pin such that it does not fall out of the assembly. Spring 204 is part of hinge assembly 105. Spring 204 serves as a conductive carrier for current traversing panels via one or more of the hinge assemblies connecting the panels together. More specifically, there are conductive copper surfaces or pads on the surfaces of the PCBs that interface directly with a hinge body of a hinge assembly. The conductive pads are connected to the traces in the PCB that carry the current from one cell to another cell in the series chain. The ends or tangs of the spring are compressed in between the hinge bodies and the copper pads in assembly on both interfacing panels enabling the current to travel from one panel to the next panel directly across the spring.

In one embodiment, spring 204 is gold plated to increase its conductivity. In one embodiment, the hinge bodies of hinge assembly 105 are hard anodized and are not electrically conductive. In this case the hinge bodies may be coated or masked with a conductive material on the areas of the hinge bodies that make contact with the spring or pads such as the bottom surfaces of the hinge bodies. Referring now to the side view, a gap A represents the thickness of a PCB substrate sandwiched between the hinge assemblies. The nominal thickness A is about 0.030 mils to address thermal dissipation concerns. In this example, backing plates 202 are chamfered at one end.

Relief areas are provided within the edges of the adjacent solar panel substrates to accommodate the spring 204 situated just between adjacent panels. Spring 204 may be a left-handed spring or a right-handed spring depending on the hinge assembly orientation whether it was mounted from the bottom or from the top surfaces of the PCBs. Similarly, relief areas of about 0.050 mils are also provided in the adjacent PCBs just above and below each hinge assembly on the edges that prevent the panels from binding together when furling or unfurling and provides relief for thermal expansion. The overall thickness of hinge assembly 105 installed on PCBs is minimal or less than 0.100 mils. Solar panel PCBs can be spaced very close together in the fan-folded state where the stack rests with the panels folded over one another or in a parallel stack. The overall thickness constraint of the hinge body and cover plate profile forms a dimensional limit for enforcing a minimum inter-panel distance when the panels are stowed in folded array or wing.

The direction of fold of the solar array depends upon on the specific configuration of mounting of the hinge assemblies to the PCBs. The fold may be cell side to cell side or bottom side to bottom side for any two adjacent panels. The options are (a) left-handed hinge assemblies mounted from the top surface, (b) Left-handed hinges mounted from the bottom surface, (c) right-handed hinges mounted from the top surface, and (d) right-handed hinges mounted from the bottom surface. Referring now to the underside view, spring tangs 205 are clearly visible while backing plates 201 are not visible in this underside view.

Figure 3:
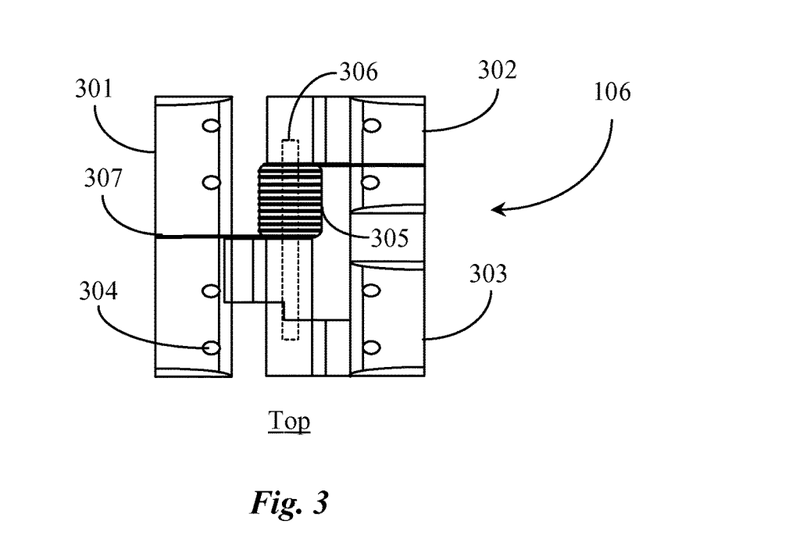
FIG. 3 is a top view of an offset hinge assembly according to an embodiment of the present invention.

FIG. 3 is a top view of offset hinge assembly 106 of FIG. 1 according to an embodiment of the present invention. Offset hinge assembly 106 provides both 90 degree and one hundred and eighty-degree positions for the attached wing or winglet. Offset hinge assembly 106 includes three hinge bodies, two backing plates, a hinge pin, and a spring. A hinge body 302 and a hinge body 303 occupy one side of the hinge assembly and share a single backing plate (not illustrated here). A hinge body 301 occupies the opposing side of the hinge assembly and has its own backing plate.

A hinge pin 306 is illustrated in this example and may extend through a portion of hinge body 301 and into a portion of hinge body 303. All of the hinge bodies in this example have threaded openings 304 provided there through for accepting backing plate screws during mounting of the hinge assembly to the PCB-based solar panels. The hinge assembly connects a solar panel winglet to a host solar panel. Winglets may be connected on both sides of the host panel using the offset hinge assemblies.

Hinge bodies 301, 302, and 303 may be aluminum parts that have been hard anodized and are therefore non-conductive. Regions of the hardware may be masked or coated with a conductive material where contact is made with the spring tangs or leads and the conductive copper pads (opposing panels) the hinge assembly is mounted over. A spring 305 is provided in this assembly and serves as an electrical conduit for passing current from a connected solar panel fanfold array to the host panel through the spring and the hinge assembly. Spring 305 may be larger than the spring used in the fanfold hinge assemblies described previously in this specification. Likewise, hinge assembly 106 is notable larger and bulkier that a fanfold-style assembly. Spring 305 may be gold plated to improve conductivity.

The host panel edges and the interfacing edges of the winglet panels require no modification to accept hinge assembly 106 accept for openings placed through the PCB to accommodate the screws that hold the assembly in place. The gap or space between the host panel edge and the interfacing edge of the connected winglet panel is much larger than the gap between panels of the fanfold-style winglet to compensate for the ninety degree stow position of the panels. When the winglet panels are folded or stacked next to the host panel, a portion of the hinge rotates into the space of the support cube or frame of the supporting solar spacecraft or vehicle. Suitable relief is provided to accept the folding offset hinges on both sides of the host panel.

In this configuration, spring 305 makes contact at one end with hinge body 302 by method of positioning the tang of the spring into a furrow or trough created in the surface of the hinge body and silver-soldering the tang into place. The surface of the hinge body and the furrow may be coated or masked with a conductive layer of material to render the hinge-body surface conductive. The masking or conductive coating extends down to and covers the underside of the hinge bodies where they interface with the conductive copper pads on the surfaces of the PCBs where the hinge assembly is mounted. The current from the connected winglet panel array travels through the hinge assembly and spring 305 onto the host panel and through traces on the host panel to a receiving terminal (108) that can be mounted to the top of the host panel for offload onto the support vehicle for powering various functions. Spring 305 has tangs 307 that make contact with special furrows or troughs that are provided for the purpose.

Figure 4:
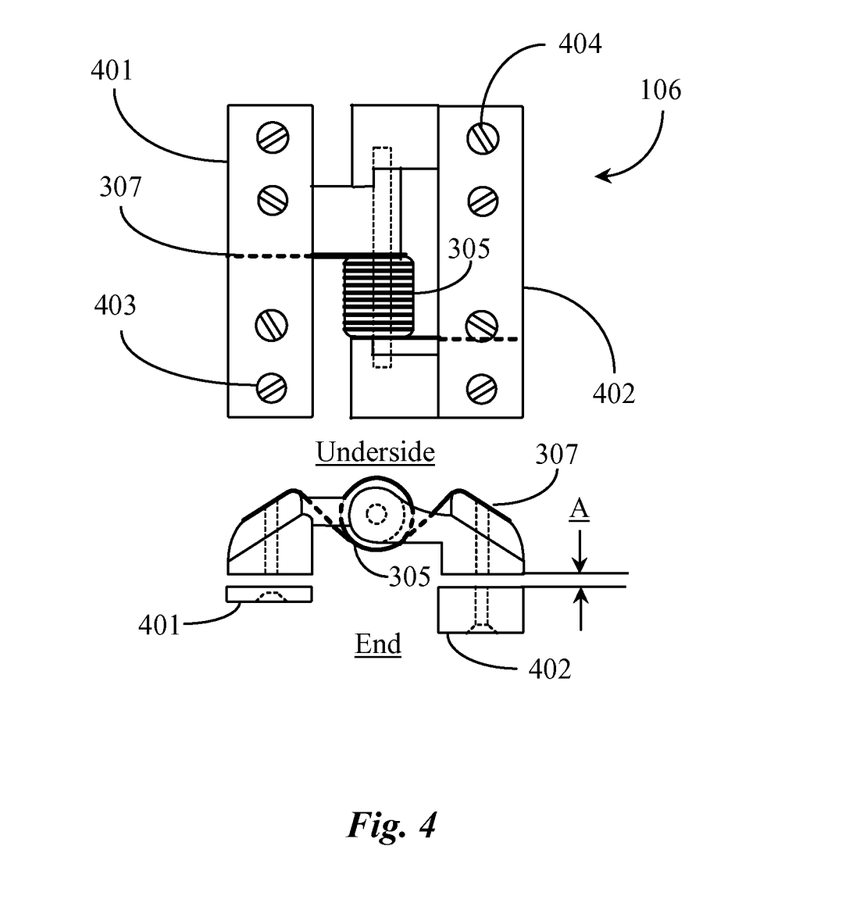
FIG. 4 is a positional view of the hinge assembly of FIG. 3 illustrating an underside and end view.

FIG. 4 is a positional view of hinge assembly 106 of FIG. 3 illustrating an underside and end view. Referring now to the underside view of hinge assembly 106, two backing plates 401 and 402 are illustrated. Each plate has four openings provided there through for accepting backing plate screws 403 and 404. A ninety-degree stop is provided into hinge body 303 and hinge body 301 where they interface for rotation to prevent over-rotation. The stop also prevents the hinge from opening past one hundred and eighty degrees.

Referring now to the end view, backing plate 402 has a greater thickness dimension than backing plate 401. Therefore, screws 404 are considerably longer that screws 403. Gap A represents the thickness of the PCB panels that are hinged together. The tangs 307 of spring 305 are, in one embodiment, silver soldered into furrows placed in the top surfaces of hinge bodies 302 and 301 respectively. In a preferred embodiment, spring 305 is installed with some compression so that it continually presses into the furrows to help maintain contact making soldering unnecessary. Suitable conductive masking is applied to all areas of the hinge assembly that need to be conductive such as the underside that contacts the conductive copper pads on the adjacent PCBs and the furrow surfaces.

In a preferred embodiment, all of the panels are electrically interconnected without wiring or cabling by creating "+" and "−" terminals for the entire serial strings of solar cells using PCB traces on each solar panel. The PCB pads directly beneath the hinge assemblies are connected to the PCB retraces on that panel. In one embodiment, the upper half of a PCB solar panel has the negative string terminal up and down each side, on both sides, and the lower half of the PCB has the positive terminal up and down each side. It is noted herein that the positive terminal is post-diode, so that multiple strings can be diode-connected together to connect in parallel. In this way, with positive and negative terminals on each side of the PCB, a limitless number of series-connected strings can be connected in parallel by hinging one PCB to the next. Using multiple hinges to conduct current "across" the solar panels reliability through redundancy is created. Moreover, each solar cell wired into a solar panel has two bonded contacts thereby enhancing reliability should one of the contact fail.

Figure 5:
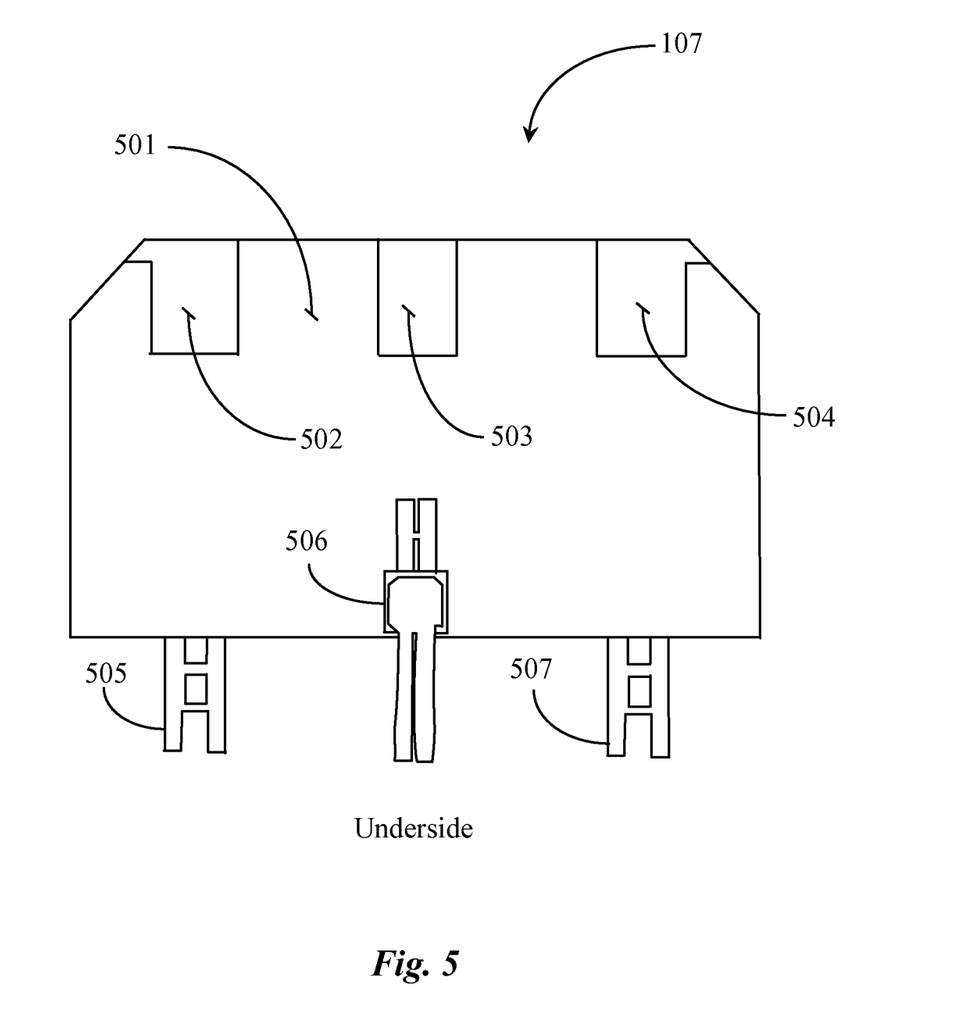
FIG. 5 is a plan view of an individual solar cell adapted for series connection according to an embodiment of the present invention.

FIG. 5 is a plan view of an individual solar cell 107 adapted for series connection according to an embodiment of the present invention. Solar cell 107 is viewed from the underside in this example. Solar cells are usually connected in series, to form strings of series-connected cells. A series of N cells delivers a voltage of N times the voltage of a single cell. Solar cell 107 is a triple-junction solar cell with interconnects and double sided NuSil™ adhesive. The shiny portions of the underside of solar cell 107 are exposed silicon substrate that is conductive. Portions 502, 503, and 504 are cut out of the NuSil™ and represent the positive terminal of the cell. The rest of the surface is covered with double-sided non-conductive tape 501. NuSil™ is not required to practice the invention as other brands of double-sided tape could be substituted for NuSil™. The negative terminal of the solar cell is represented in this example by interconnects 505 and 507.

Interconnect 506 is a diode and is attached to the underside of the solar cell. Cutouts 502, 503, and 504 provide positive terminal connection for the interconnects of the next cell in series to be placed on a solar panel. Interconnects of the neighboring solar cell are all connected to the positive terminal of the previously mounted solar cell. The connections can be accomplished by soldering, use of conductive epoxy, laser spot-welding or the like.

In a preferred embodiment, the thickness of the adhesive applied to the underside surface of the solar cell 107 is managed such that the thickness of the adhesive is sufficiently greater than the thickness of diode 506 to accommodate the diode in the assembly. Similarly, interconnects 505 and 507 are sufficiently thinner than diode 506 ensuring sufficient relief for laying the solar cells onto the PCB. Cutouts 502, 503, and 504 have a depth equal to the overall thickness of the adhesive used, which may be approximately 12 mils thick (4 layers of 3 mills thick tape). Conductive bonding agents or solder can be used to secure the installation at the interconnects.

Figure 6:
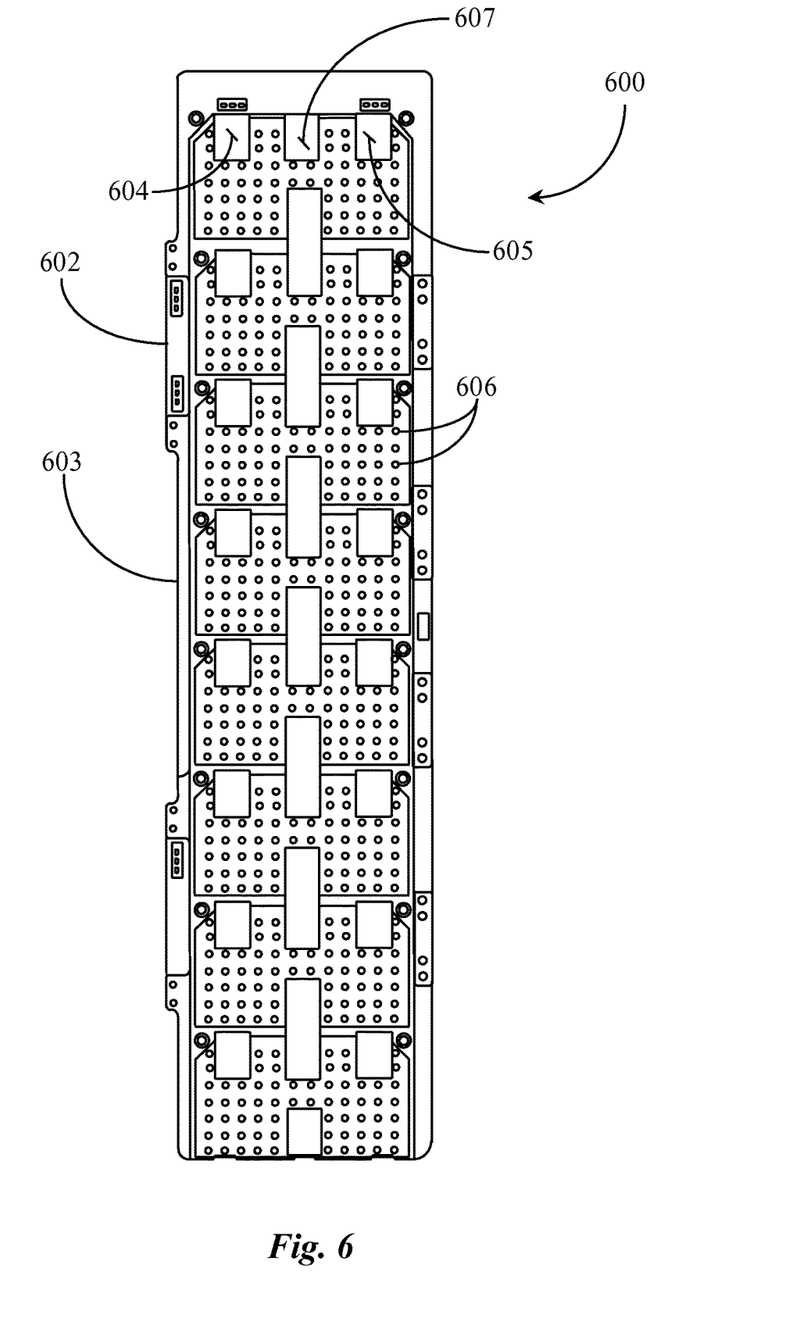
FIG. 6 is a plan view of a printed circuit board adapted as a solar panel substrate according to an embodiment of the present invention.

FIG. 6 is a plan view of a printed circuit board 600 adapted as a solar panel substrate according to an embodiment of the present invention. PCB 600 is thinner than the standard thickness dimension of about 62 mils. The thickness of PCB 600 is approximately 30 mils. In one embodiment the individual solar cells are installed on PCB 600 using only a single layer of double-sided adhesive per cell.

PCB 600 has conductive surfaces or copper pads, in one embodiment, to accommodate interconnects on the underside of a solar cell such as cell 107 of FIG. 5. Pads 604 and 605 correspond to cutouts 504 and 502 on individual solar cell 107 of FIG. 5. Conductive surface 607 corresponds to cutout 503 of solar cell 107 of FIG. 5. PCB 600 includes electrically isolated copper planes with multiple vias 606 placed there through to facilitate thermal conduction from cells on the cell-side of the panel to the underside of the PCB or the radiator side of the panel.

Areas directly underneath contacts on the underside of each solar cell are devoid of copper and are either bare PCB materials (FR4) or solder mask over FR4. Isolator traces or bars are used between the copper areas and the bare areas of PCB 600. Isolators appear as PCB traces having a 30 to 100 mils width. These isolators serve as an enclosure in at they enclose or partially enclose interconnects and any bonding agents used to connect interconnects to the underside of the solar cells. The height of these isolators is about 1.4 mils per oz of copper and further aids in containing any bonding agents within a prescribed region on the PCB.

PCB 600 includes protruding tabs like tab 602 and areas of cutout like cutout 603 along its edges in order to accommodate hinge assembly mounting. The exact pattern of tabs and cutouts depends on the hardware that is installed on that edge of the PCB. Typically speaking, the fanfold panels will have edges adapted for the fanfold hinge assemblies while the side facing the host panel will be adapted for the offset hinge assemblies.

It is noted herein that the right edge of PCB 600 is adapted for connection to a host panel rather than another winglet panel. It is noted herein that the bottom edge of PCB 600 has indentions that enable a solar cell interconnect to be "wrapped" around the edge of the PCB and then connected to a copper terminal on the other side. The edge of the PCB has small indentations or cutouts provided thereon so that interconnects do not extend past the edge of the PCB. In this way the interconnects are protected from mechanical damage.

Figure 7:
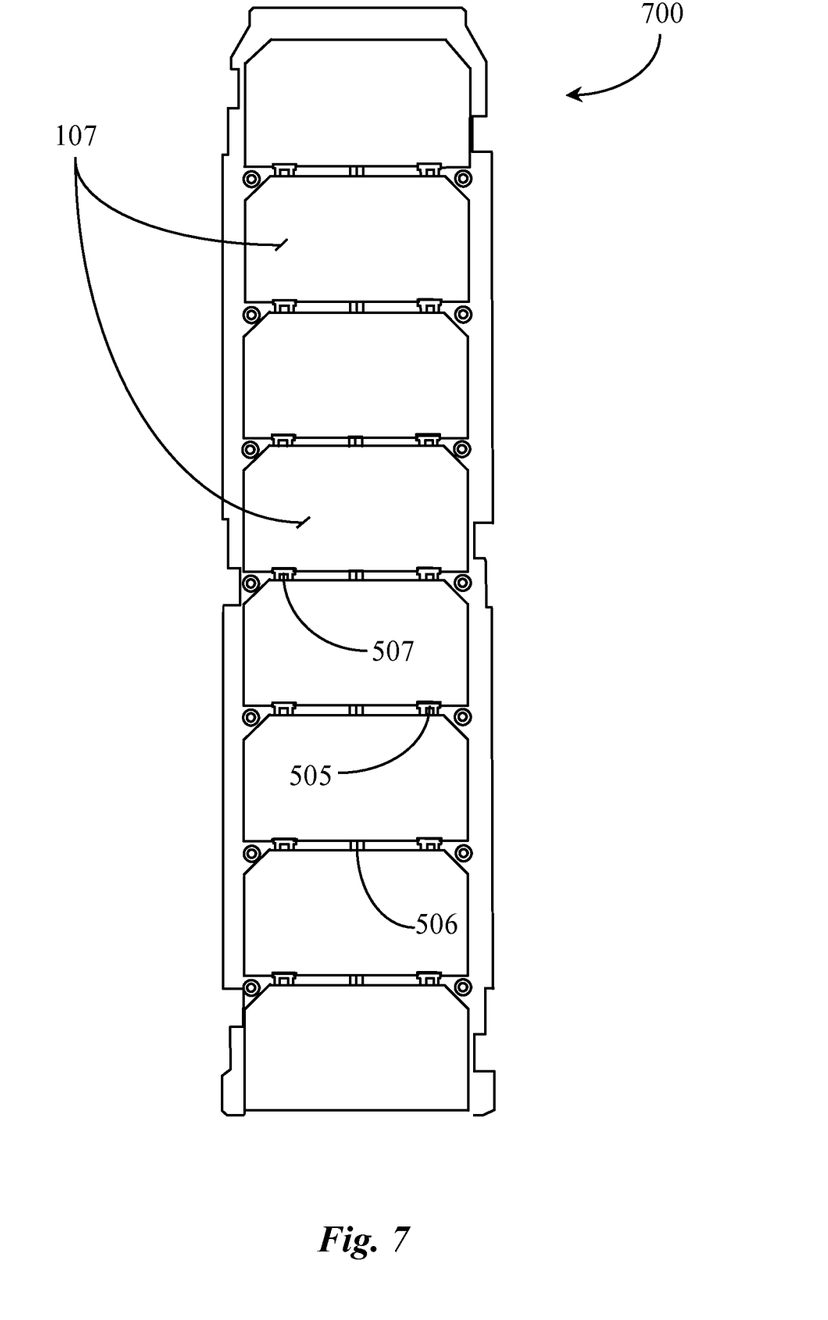
FIG. 7 is a plan view of a solar panel with solar cells installed thereon and connected in series.

FIG. 7 is a plan view of a solar panel 700 with solar cells installed thereon and connected in series. In this view solar cells 107 are installed on PCB 700. Interconnects 507, 505, and 506 are just visible between the cells. Cutouts for fanfold style hinges are visible on both sides of the PCB. The exact configuration of an edge of a PCB used as a substrate for solar cells will depend entirely of the hardware used in the hinge assemblies.

In this example, all of the solar cells are installed with the bottom interconnects wrapped about the edge of the PCB with the aid of indents so that no interconnect extends beyond the edge of the PCB. The area of the PCB that is not conductive may be solder masked with a non-conductive, protective tape like Kaptron tape. A laser system is used to clear the Kaptron from the terminal and conductive areas of the PCB and also to clear vias of the tape.

It will be apparent to one with skill in the art that the solar panel array of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

What is claimed is:

1. A solar panel assembly comprising:
   a first and a second elongate printed circuit board, each elongate printed circuit board supporting a plurality of individual solar cells mounted thereon and electrically connected in series by conductive traces to form a first and second solar panel; and
   a hinge assembly comprising a first and a second non-conductive hinge body joined by a hinge pin providing an axis of rotation between the hinge bodies, and a single, electrically-conductive coil spring having a wound length around the hinge axis, a first tang extending from one end in a direction at a right angle to the hinge axis, and a second tang extending from an opposite end extending at a right angle from the hinge axis and opposite in direction to the direction of the first tang;
   wherein the first non-conductive hinge body is mounted over a first conductive pad located along a first edge of the first solar panel, the first conductive pad connected to conductive traces of the first solar panel, the second non-conductive hinge body is mounted over a second conductive pad located along a second edge of the second solar panel, the second conductive pad connected to conductive traces of the second solar panel, the first and second edges adjacent, the hinge pin is joined pivotally to the first and the second non-conductive hinge bodies with the axis of rotation in the direction of the first and second edges, spacing the first and second non-conductive hinge bodies apart by a distance equal to or greater than the wound length of the electrically-conductive coil spring, and the electrically-conductive coil spring surrounds the hinge pin with the first tang captured between the first non-conductive hinge body and the first conductive pad, and the second tang captured between the second conductive pad and the second non-conductive hinge body, electrically connecting the conductive traces of the first and the second solar panels.

2. The solar panel assembly of claim 1 further comprising at least one additional hinge assembly identical to the first hinge assembly joining the first and the second solar panels, the additional at least one hinge assembly mounted in the same manner as the first hinge assembly.

3. The solar panel assembly of claim 2, wherein the hinge assemblies provide for folding the first solar panel over the second solar panel in one direction to lie in adjacent parallel planes.

4. The solar panel assembly of claim 3 further comprising a third solar panel joined by hinge assemblies to the second solar panel in a manner that the solar cells in the third solar panel are electrically joined in series with the solar cells of the first and second solar panels, and in a manner that the direction of rotation of the third solar panel to the second solar panel is opposite the direction of rotation of the second solar panel with the first solar panel, providing that the three solar panels may be fan-folded to be positioned in three adjacent parallel planes.

5. The solar panel assembly of claim 2, wherein the electrically conductive coil springs are gold plated to improve conductivity.

6. The solar panel assembly of claim 4 wherein the hinge assemblies having electrically conductive coil springs connect the third solar panel through the conductive coil springs to an additional panel that offloads collected power to a receiving terminal.

* * * * *